United States Patent Office 3,751,393
Patented Aug. 7, 1973

---

3,751,393
RADIATION-SENSITIVE POLYMERS PREPARED FROM HYDROXYL CONTAINING POLYMERS AND 4 - AZIDOSULFONYL-PHTHALIC ANHYDRIDE
Adnan A. R. Sayigh and Fred A. Stuber, North Haven, and Henri Ulrich, North Branford, Conn., assignors to The Upjohn Company, Kalamazoo, Mich.
No Drawing. Filed May 10, 1971, Ser. No. 142,042
Int. Cl. C08g 5/18, 33/00
U.S. Cl. 260—49       4 Claims

---

ABSTRACT OF THE DISCLOSURE

Radiation-sensitive polymers are prepared by reacting a polymer having a free hydroxyl group in the molecule with 4-azidosulfonylphthalic anhydride. The polymers so obtained contain free carboxy groups which can be converted to water soluble salts. The polymers are useful for chemically bonding basic dyestuffs to non-dyereceptive substrates (e.g. polyolefins) by coating the substrate with the polymer, exposing the coated substrate to irradiation to bond the coating to the substrate and then contacting the irradiated coating with a basic dyestuff which bonds to the coating via the free carboxylic groups therein. The irradiation can be carried out imagewise to obtain continuous tone images. Bonding of the radiation-sensitive polymers to substrates can also be used to make photoresists and also to render hydrophilic a variety of substrates which ordinarily are hydrophobic.

---

BACKGROUND OF THE INVENTION

(1) Field of the invention

This invention relates to novel radiation-sensitive polymers and is more particularly concerned with radiation-sensitive polymers having free carboxy containing azidosulfonylphthaloyl moieties in the recurring unit thereof and with salts thereof, and with the use of said polymers to produce continuous tone images without the use of silver and/or to modify the properties of substrates which are normally hydrophobic and/or not receptive to basic dyestuffs.

(2) Description of the prior art

U.S. Pat. 3,455,689 describes the preparation of a series of polymers which have azidosulfonyl substituents in the polymer chain. In one of the specific embodiments there shown, various polymers having free hydroxyl groups in the chain thereof are acylated using m- or p-azidosulfonylbenzoyl chloride to obtain the corresponding azidosulfonylbenzoyl derivatives of said hydroxy containing polymers. In another specific embodiment shown in the same specification, polymers having azidosulfonyl substituents in the chain are obtained by reaction of 5-azidosulfonyl isophthaloyl chloride with a diol such as bisphenol A to yield the corresponding polyester. The various polymers with azidosulfonyl substituents in the polymer chain are shown to be readily cross-linked by irradiation to yield polymers which are insoluble in various organic solvents. These findings are applied to the preparation of relief images on a variety of substrates. It is also disclosed that these images can be treated with dyestuffs to yield colored images but no method is disclosed for attaching the dyestuffs to the relief images by a permanent chemical bond.

Related polymers containing aromatic azidosulfonyl groups linked to the polymer chain via a urethane group are shown in U.S. Pat. 3,462,268. U.S. Pat. No. 3,453,108 shows polymers of the structure shown in the aforesaid U.S. Pat. 3,455,689, which also have a pyrazolino group pendant from the polymer chain.

We have now found that radiation-sensitive polymers having both carboxyl groups and free azidosulfonyl groups can be prepared from hydroxyl containing polymers using a novel azidosulfonyl compound and that continuous tone images can be produced therefrom on a variety of substrates. We have further found that basic dyestuffs can be bonded chemically to said images. We have also found that novel systems described herein can be adapted for use with aqueous developing systems which finding represents a considerable advantage both from the point of view of economics and convenience.

SUMMARY OF THE INVENTION

The invention comprises a radiation-sensitive polymer selected from the group consisting of (i) the poly-O-acyl derivative of a polymer having a free hydroxyl group in the recurring unit thereof characterized in that the acyl group of said poly-O-acyl derivative contains a carboxylic acid group and has the structure

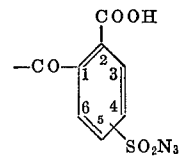

wherein the —SO$_2$N$_3$ group is in one of the positions 4 and 5 in the benzene ring to which it is attached, and (ii) the salts of the above poly-O-acyl derivatives with a salt-forming moiety selected from the class consisting of alkali metals, alkaline earth metals, ammonia and organic amines.

The invention also comprises a process for chemically bonding a basic dye to a polymer substrate which is not normally receptive to dyestuffs, said process comprising applying a radiation-sensitive polymer, as defined above, to said polymer substrate, exposing the treated substrate to radiation which activates the radiation-sensitive polymer and effects bonding between the radiation-sensitive polymer and the substrate, and then contacting the exposed treated substrate with a basic dyestuff.

The term "radiation-sensitive" is used herein to indicate that the polymers of the invention can be activated and undergo molecular modification on exposure to thermal and/or actinic radiation.

In addition to their usefulness in chemically bonding basic dyestuffs to polymeric and other substrates and in producing continuous tone, non-silver containing images, the radiation-sensitive polymers of the invention are useful in converting normally hydrophobic polymer materials to hydrophilic materials and in the preparation of photoresist systems as will be discussed more fully hereinafter.

DETAILED DESCRIPTION OF THE INVENTION

The novel radiation-sensitive polymers of the invention, characterized by the recurring unit defined above, are prepared conveniently by reacting the starting hydroxyl group containing polymer (I) with 4-azidosulfonylphthalic anhydride (II). The reaction is carried out in the presence of a tertiary base and, advantageously, in the presence of an inert organic solvent. Examples of tertiary bases which can be used and which are generally present in the reaction mixture in an amount corresponding to at least 10 percent by weight of the hydroxyl group containing polymer (I) are pyridine, N,N-dimethylaniline, triethylamine, N-methylmorpholine, N-methylpiperidine and the like. Pyridine is the preferred tertiary base and can, if desired be used in sufficient amounts to act as solvent as well as catalyst for the reaction. Indeed, in a most preferred embodiment of the invention, the reaction is carried out with both reactants in solution in pyridine.

However, in place of the excess of pyridine as solvent, there may be used an inert organic solvent, i.e. an organic solvent which does not enter into reaction with either reactant or interfere in any way with the desired course of the reaction. Examples of inert organic solvents are acetonitrile, acetone, cyclohexanone, tetrahydrofuran, dioxane and the like.

The reaction is advantageously carried out at elevated temperatures, i.e., from about 50° C. to about 150° C. in order to achieve a suitable rate of reaction. The course of the reaction can be followed by routine procedure, for example, by infrared spectroscopic examination of aliquots.

The relative molar proportions in which the reactants, namely hydroxy-containing polymer (I) and the anhydride (II), are employed determines the nature of the product. Thus, by using one molar proportion of the anhydride (II) for each hydroxyl group in the polymer (I), there is obtained a product in which each of the hydroxyl groups in the starting polymer (I) has been acylated. By using less than one molar proportion of anhydride (II) for each hydroxyl group in the polymer (I) there is obtained a product in which some, but not all, of the original hydroxyl groups in the starting polymer (I) have been acylated. The proportions of acylated hydroxyl groups to free hydroxyl groups in the final product is directly proportional to the molar proportion of anhydride (II) employed in the above reaction. Thus, as little as one-tenth of the stoichiometric proportion of anhydride (II) can be employed whereby only 10 percent of the free hydroxyl groups in the starting polymer (I) will be acylated. The resulting partially converted polymer exhibits useful light sensitive properties but is less efficient, in the photoresist and image forming systems to be described hereinafter, than the more fully or wholly acylated polymers of the invention obtained using greater proportions of anhydride (II).

When the above reaction between the anhydride (II) and the hydroxyl containing polymer (I) is adjudged complete, the desired radiation-sensitive polymer of the invention is isolated from the reaction product by procedures conventional in the art. For example, the inert organic solvent can be removed or, alternatively, a solvent in which the desired product is insoluble can be added to the reaction mixture. The desired product is then either left as a residue of the distillation or is precipitated from solution and isolated by filtration, decantation, or like means. Purification can be effected by routine procedures such as solvent extraction, reprecipitation, chromatography, and the like.

The reaction of the hydroxyl-containing polymer (I) and the aziosulfonylphthalic anhydride (II) results in the opening of the anhydride ring. The ring opening gives rise to one free carboxyl group and one esterified group in the azidosulfonyl containing moiety and two possible isomeric forms of the resulting acyl group in the radiation-sensitive polymer can exist as follows:

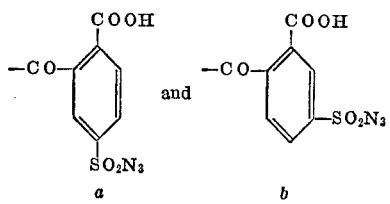

In isomer *a* the azidosulfonyl group is in para-position with respect to the carboxylic acid group. In isomer *b* the azidosulfonyl group is in meta-position with respect to the carboxylic acid group. It will be apparent to one skilled in the art that the radiation-sensitive polymers of the invention will contain, in the same polymer chain, some acyl groups having the structure *a* and some having the structure *b*.

By virtue of the free carboxyl group in the recurring unit of the radiation-sensitive polymers of the invention, said polymers can be converted to the corresponding carboxylic acid salts by reaction with the appropriate base. As will be obvious to one skilled in the art, it is possible to convert only one, or several, or all the plurality of free carboxy groups in the chain of the polymer of the invention to the corresponding salts. In general the greater the number of carboxyl units which are converted to salt form, the greater the water solubility of the resulting polymer. The polymers of the invention in which one or more or all of the free carboxylic groups are converted to salts are included within the scope of the invention.

Illustratively, the radiation-sensitive polymers of the invention can be converted to their alkali metal, alkaline earth metal, ammonium and organic amine salts. "Alkali metal" is inclusive of sodium, potassium, lithium, rubidium, caesium and the like. "Alkaline earth metal" is inclusive of calcium, barium, strontium, magnesium and the like. "Organic amine" is inclusive of monoalkylamines such as methylamine, ethylamine, isopropylamine, sec-butylamine, amylamine, hexylamine, isohexylamine, octylamine and the like; dialkylamines such as dimethylamine, N-ethyl-N-methylamine, N-methyl - N - propylamine, N-methyl - N - isobutylamine, diisopropylamine, N-ethyl-N-hexylamine, N-methyl-N-isooctylamine and the like; trialkylamines such as triethylamine, trimethylamine, N,N-dimethylpropylamine, N,N-dimethylhexylamine, N,N-diethylisobutylamine and the like; monoalkenylamines such as allylamine, 2-butenylamine, 3-hexenylamine, octenylamine and the like; dialkenylamines such as diallylamine, di-2-butenylamine, di-3-hexenylamine and the like; cycloalkylamines such as cyclopropylamine, cyclobutylamine, cyclopentylamine, cyclohexylamine and the like; N-alkylcycloalkylamines such as N-methylcyclopentylamine, N-ethylcyclopentylamine, N-propylcyclohexylamine and the like; cycloalkenylamines such as cyclopentenylamine, cyclohexenylamine and the like; aralkylamines such as benzylamine, phenethylamine, phenylpropylamine, benzhydrylamine and the like; N-alkyl-N-aralkylamines such as N-methylbenzylamine, N-propylbenzylamine, N-isobutylbenzylamine, N-octylbenzylamine, N - methylphenethylamine and the like; N,N-disubstituted aralkylamines such as N,N-dimethylbenzylamine, N-methylbenzhydrylamine, N,N-diethyl-3-phenylpropylamine, N-butyl - 2 - phenethylamine and the like; N-alkyl-arylamines such as N-methylaniline, N-isopropylaniline, N-hexylaniline, N-methyl-p-toluidine, N-ethyl-m-xylidine, N-methylnaphthylamine, N-methylbenzidine, N,N'-dimethylbenzidine and the like; N,N-dialkylarylamines such as N,N-dimethylaniline, N,N-dibutylaniline, N-hexyl - N - methylaniline, N,N-dimethyltoluidine and the like; N-aralkyl-arylamines such as N-benzylaniline, N-phenethylaniline, N - benzhydrylaniline and the like; arylamines such as aniline, o-, m-, and p-toluidine, o-, m-, and p-xylidine, 1-naphthylamine, 2-naphthylamine and the like; alkanolamines such as ethanolamine, propanolamine, diethanolamine and the like; heterocyclic amines such as pyridine, quinoline, pyrrolidine, piperazine, morpholine, and alkyl-substituted pyrrolidines, piperidines, piperazines and morpholines, such as N-methylpyrrolidine, N-ethylpiperidine, N-methyl-N'-hexylpiperazine, N-methylmorpholine and the like.

The above salts of the radiation-sensitive polymers of the invention can be prepared readily from the free carboxylic acid polymers of the invention by any of the methods conventionally used in the art for preparing carboxylic acid salts of this type. Illustratively, the free carboxylic acid polymer is dissolved in a water-miscible solvent such as acetone and treated with the appropriate amount of base to neutralize some or all of the free carboxyl groups in the polymer. In the preparation of the alkali metal, alkaline earth metal, or ammonium salts, the base is advantageously in the form of an aqueous solution of the corresponding hydroxide or carbonate or an alcohol solution of the corresponding alkoxide. In the case of the amine salts, the free amine is used as the base, advantageously as a solution in a water-miscible solvent. The resulting salt separates from solution particularly if there is little or no water present in the reaction mixture. Alternatively, the salt can be isolated by partial or complete evaporation of the solution or by addition of an appropriate salt in which the salt is insoluble.

It will be readily appreciated by one skilled in the art that part of the free carboxylic acid groups in the polymers of the invention can be converted to the corresponding salt using a first base, and some or all of the remaining free carboxylic acid groups in the partially neutralized polymer can be reacted with a second base and even with a third or fourth base so as to produce mixed salts of the polymers of the invention.

In general the molecular weight of the radiation-sensitive polymers of the invention will be within the range of about 100,000 to about 2,000,000. Said polymers are, for the most part, resinous solids which are soluble, in the form of the free carboxylic acid, in polar solvents such as acetone, methyl ethyl ketone, tetrahydrofuran, dioxane and the like, from which they can be cast as films as will be described in more detail hereinafter. In the form of their salts, either partially or fully neutralized, the polymers of the invention are soluble in water and aqueous liquids and can be cast as films therefrom.

The polymers (I) having a free hydroxyl group in the recurring unit thereof which are employed in the preparation of the radiation-sensitive polymers of the invention can have molecular weights from about 1000 all the way up to 1,000,000 or even higher. Illustrative of the polymers (I) are:

(i) Polyvinyl alcohols (PVA). These polymers are well known in the art, are available in a wide range of molecular weights within the above range, and can be prepared readily by hydrolysis of the corresponding polyvinylacetates; see, for example, Manufacture of Plastics, Edited by W. Mayo Smith, Reinhold, New York, 1964, page 256 et seq. The polyvinyl alcohols are characterized by the recurring unit:

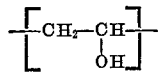

(ii) Novolac resins. These resins are the products obtained by acid condensation of phenol, or a substituted phenol, with formaldehyde and are conventionally represented by the general formula:

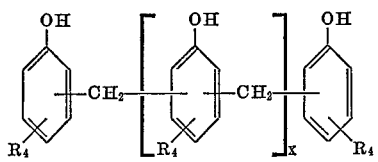

wherein $x$ has an average value of about 8 to about 12 and $R_4$ represents from 0 to 4 substituents selected from halogen and lower-alkyl groups. It is to be understood that the above formula is highly idealized and is an approximation only; see for example, Carswell, "Phenoplasts," pages 29 to 35, Interscience, New York, 1947. A wide range of novolac resins of differing molecular weights within the above quoted range is available commercially, all of which are represented approximately by the above formula.

(iii) Phenoxy resins characterized by the following structure:

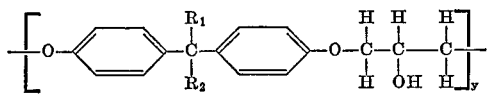

wherein $R_1$ and $R_2$ each represent lower-alkyl. These resins are obtained by reaction of the corresponding bisphenol and epichlorohydrin; see, for example, U.S. Pats. 3,277,051 and 3,401,139. They are available commercially in a molecular weight range of about 15,000 to about 60,000.

(iv) Poly(hydroxydicyclopentadiene) ethers. These polymers are characterized by the following molecular structure

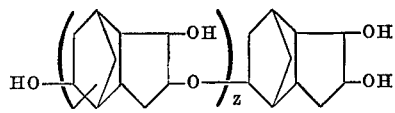

wherein $z$ has an average value within the range of about 10 to about 14. These resins are available commercially and are prepared by polymerization of the corresponding hydroxydicyclopentadiene oxide of the formula:

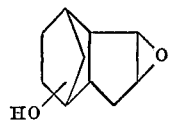

The term "lower-alkyl" as used herein means alkyl from 1 to 8 carbon atoms, inclusive, such as methyl, ethyl, propyl, butyl, pentyl, hexyl, heptyl, octyl, and isomeric forms thereof.

The 4-azidosulfonylphthalic anhydride (II) which is employed in synthesizing the radiation-sensitive polymers of the invention is a novel compound which is obtained conveniently by conversion of 4-sulfophthalic anhydride to the corresponding acid chloride, using phosphorus pentachloride, thionyl chloride, phosgene and like reagents conventional in the art of converting a sulfonic acid to the corresponding sulfonyl chloride, and then reacting the latter with a substantially stoichiometric amount of sodium azide. The method of preparation of anhydride (II) is more particularly illustrated in the preparation set forth before the specific examples below.

As set forth previously, the novel radiation-sensitive ploymers of the invention are useful for a variety of purposes. For example, said polymers can be used as a means of chemically bonding basic dyestuffs to the surface of a variety of substrates such as paper, cotton, and the like cellulosic materials, metal, glass and the like as well as substrates which contain a plurality of —C—H bonds, such as polyolefins, polyurethanes, polyamides, polyesters, polyacetals and the like, which are not normally receptive to such dyestuffs. In this particular use of the polymers of the invention, a coating of the latter is applied to a part, or the whole, of the surface of the substrate to be treated. The coating is applied advantageously by dissolving the radiation-sensitive polymer of the invention in a polar solvent, such as exemplified above, and spreading the solution on the substrate using the appropriate spreading means.

If desired, the radaition-sensitive polymer of the invention can be employed in the form of a salt, as hereinbefore defined, in which case the polymer coating can be applied by using an aqueous solution of the salt. Advantageously, the polymer is employed as a partially neutralized salt, i.e. only a portion of the free carboxylic acid groups have been converted to the salt leaving free carboxylic groups in the polymer chain available for coupling with dyestuff in the latter stages of the process.

The coated substrate is then exposed to an appropriate source of radiation, either thermal or actinic, necessary to activate the polymer of the invention. A wide variety of sources of thermal and/or actinic radiation can be employed. Such sources include carbon arc, mercury vapor lamps, fluorescent lamps, argon glow lamps, photographic flood latmps, and tungsten lamps. Preferably the source of radiation is one which generates ultraviolet light of wavelength within the range of about 250 nm. to about 390 nm.

If desired, the irradiation of the coated substrate can be performed "imagewise"; that is to say, a negative of an image to be produced on the surface of the substrate is interposed between the coated substrate and the source of radiation. The radiation-sensitive polymer in those portions of the coated substrate receiving the radiation is activated and becomes chemically bonded to the surface of the substrate. The chemical bonding of the radiation-sensitive polymer to the substrate is believed to take place by degradation of the sulfonazido group or groups in the moieties (I) to yield a nitrene radical which enters into interaction with —C—H bonds in the substrate. This suggested reaction mechanism is, however, offered by way of explanation only and is not intended in any way to define or limit the scope of the present invention.

When the coating of the polymer of the invention has been bonded to the substrate in the above manner, the surface of the substrate, or in the case of imagewise irradiation, that portion of it bearing the irradiated image, has directly bonded to it a series of free carboxyl groups in the recurring units (I). The resulting image can be developed by removal of unchanged polymer (I) from unirradiated areas and treatment of the irradiated surface with a basic dye thereby achieving chemical bonding of the basic dyestuff to the surface of the substrate via said free carboxyl groups.

The removal of the unchanged polymer from the non-irradiated areas can be accomplished, in the case where the initial polymer was employed in the free carboxylic acid form, by washing with a polar solvent, advantageously the same solvent as was used in coating the substrate originally. Alternatively, and preferably, the unchanged polymer in the free carboxylic acid form is removed by washing with an aqueous solution of a base such as alkali metal hydroxide, alkali metal carbonate, ammonium hydroxide, alkaline earth metal carbonate, and the like. The unchanged polymer is removed as an aqueous solution of its salt and, if desired, the free carboxylic acid form can be recovered therefrom for re-use by acidification of the solution.

Where the polymer was applied to the substrate in the form of a water-soluble salt, the removal of unchanged polymer after imagewise irradiation is effected readily by washing with water. The polymer can be recovered as such or in the free carboxylic acid form from the aqueous washings by acidification and isolation of the resulting precipitate.

The application of the dyestuff to the treated substrate, after development if required, can be accomplished in any conventional manner, as by dipping in a bath of dyestuff, or application of dye by roller, sponge and the like.

The term "basic dyestuff" is one well-recognized in the art as characterizing a particular class of dyestuffs, namely those which will react with an acid (mineral acid or organic carboxylic acid) to form a corresponding salt. A comprehensive list of basic dyestuffs and a description of their properties is set forth in Colour Index, second edition, vol. 1, pages 1617 to 1653, 1956, published jointly by The Society of Dyers and Colourists, Bradford, Yorkshire, England, and The American Association of Textile Chemists and Colorists, Lowell, Massachusetts. Any of the basic dyestuffs set forth in said Colour Index can be employed in the process and compositions of the invention. Generally said basic dyestuffs are employed in the form of aqueous solutions.

Typical of said basic dyestuffs are: crystal violet, methylene blue, malachite green, auramine O, basic fuchsin, Aniline Yellow, Disperse Orange 3, Disperse Black 7, Disperse Red 13, Disperse Red 9, Vat Red 33, Mordant Violet 6, Phenylene Blue, Disperse Orange 11, Natural Orange 6, Natural Brown 7, and Natural Yellow 12.

As will be readily appreciated by one skilled in the art, the above process, for chemically bonding basic dyestuffs to polymeric substrates not normally receptive to such dyes, can be adapted to a variety of dyeings and/or printing techniques. For example, the printing of advertising and like matter on polymer films can be accomplished readily on a continuous basis by passing a continuous sheet of said film successively through zones in which the film is coated with a radiation-sensitive polymer of the invention, coated film is exposed imagewise to activating radiation from an appropriate source, the unexposed coating is removed using any of the procedures described above, and finally, the film with image bonded in place is contacted with basic dye.

In an alternative, but less preferred, method of employing the novel polymers of the invention to chemically bond dyes to substrates, the novel polymer of the invention is treated with the dyestuff in a preliminary step and the radiation-sensitive polymer, with dye incorporated therein, is applied as a coating to the surface of the substrate to be treated. The coated substrate is then exposed to appropriate radiation to effect bonding of the radiation-sensitive polymer (with dye already attached) to the substrate. The exposure to radiation can be done imagewise, if desired, and the unexposed radiation-sensitive polymer+dye can be eluted from the exposed surface leaving the required image bonded to the substrate.

In another, related, use of the novel radiation-sensitive polymers of the invention having the recurring unit (I), the latter are applied in the form of a coating to the substrate and bonded thereto by irradiation as described above. The surface of the substrate is thereby rendered hydrophilic by virtue of the carboxylic moieties present in the polymer. If desired, the carboxylic acid moieties can be converted to the corresponding alkali metal or alkaline earth metal, or ammonium salt phase to increase or modify the hydrophilic properties. The above procedure represents a very convenient method of rendering hydrophilic the surfaces of substrates such as polyolefins and the like which are normally hydrophobic.

In yet another use of the novel radiation-sensitive polymers of the invention, the latter are employed as the components of a photoresist system. For example, the said polymers can be used in photographic reproduction and printing arts to produce printed masters as follows. The polymer is dissolved in a polar organic solvent such as those exemplified above or, in the case of a salt of polymer, the salt is dissolved in aqueous or polar solvent solution, and cast as a film on an appropriate substrate such as paper, metal and the like film supports normally employed in the reproduction art. A negative of the image to be reproduced, e.g. lined, screened or half-tone negatives, or diapositives, is interposed between the supported film so obtained and a source capable of producing radiation necessary to activate the radiation-sensitive polymer. The polymer in those portions of the supported film exposed to the radiation is thereby bonded to the substrate. The polymer in the unexposed portions of the film can then be removed, using any of the techniques described above, leaving the exposed polymer bonded to the substrate in the form of a positive image corresponding to the negative used in the irradiation step. Said image has high resistance to solvents and mechanical stresses and can be used to advantage as a master from which to reproduce copies of the original.

In a similar manner photoresist systems produced from the radiation-sensitive polymers of the invention can be used in other photoresist applications such as in the printing of microcircuitry and related applications which involve production of an image, in the form of bonded polymer, on a metal substrate such as copper, followed by removal, in part or in toto, of the uncoated metal by etching. Essentially the same technique as that described above in the production of printed masters is employed in the formation of the polymer image on the substrates.

In any of the irradiation processes described above in which the radiation-sensitive polymers of the invention are bonded to substrates by exposure to appropriate radiation, there can be employed a sensitizer. The latter can be any of the sensitizers known in the art as useful in enhancing the sensitivity to radiation of azido and sulfonazido groups. Illustrative of such sensitizers are triphenylmethane dyes, aromatic ketones such as Michler's ketone, dimethylaminobenzaldehyde, 4 - methoxyacetophenone, 2-methoxyxanthone, N-phenylthioacridone, 1,2-benzanthraquinone, 1,8-phthaloylnaphthalene, α-naphthoquinone and the like, 5-nitroacenaphthene, pyrene, acridine, 2-nitrofluorene, 1-nitropyrene, the pyrylium, thiapyrylium, and selenopyrylium dye salts disclosed in U.S. 3,475,176; and the various heterocyclic sensitizers listed in U.S. Pats. 3,528,812, 3,528,813, and 3,528,814.

The water-soluble salts of the radiation-sensitive polymers of the invention are additionally useful in that they can be used as electrolytes in the electrodeposition of polymer coatings on metals and the like in accordance with procedures well-known in the art.

The following preparations and examples describe the manner and process of making and using the invention and set forth the best mode contemplated by the inventors of carrying out the invention but are not to be construed as limiting.

Preparation.—4-chlorosulfonylphthalic anhydride

To a suspension of 229.35 g. (1.1 mole) of phosphorus pentachloride in 1000 ml. of acetonitrile, there was added slowly a total of 228 g. (1 mole) of 4-sulfophthalic anhydride. The reaction mixture was stirred and heated under reflux for a total of 150 minutes. At the end of this time the solvent was removed by distillation and the residue was dissolved in 1000 ml. of methylene chloride. The solution was washed with 300 ml. of water and then dried over anhydrous magnesium sulfate. The dried solution was filtered and the filtrate was evaporated to dryness. The residue was distilled in vacuo to obtain 163.2 g. (66.2 percent theoretical yield) of 4-chlorosulfonylphthalic anhydride having a boiling point of 170° C. at 0.5 mm. of mercury. The product solidified (on standing) to a crystalline solid having a melting point of 91 to 92° C. The infrared spectrum of this compound (chloroform solution) exhibited maxima at 1869 and 1786 cm.$^{-1}$.

Analysis.—Calcd. for $C_8H_3ClO_5S$ (percent): C, 38.95; H, 1.22; Cl, 14.37. Found (percent): C, 38.80; H, 1.53; Cl, 14.16.

EXAMPLE 1

A mixture of 1.27 g. (0.005 mole) of 4-azidosulfonylphthalic anhydride and 2.84 g. (0.01 unit/mole) of poly(oxy-1,4-phenylene isopropylidene - 1,4-phenyleneoxy-2-hydroxytrimethylene) [Bakelite Phenoxy Resin PKHH: Average molecular weight=30,000] in 50 ml. of dry pyridine was stirred and heated at 70 to 80° C. for 5 hours. At the end of this time the majority of the pyridine was distilled away and the residue was dissolved in 50 ml. of a 1:1 by volume mixture of acetone and tetrahydrofuran. The resulting solution was added to 50 ml. of 2 N hydrochloric acid and the precipitate so formed was isolated by filtration, redissolved in 50 ml. of tetrahydrofuran and reprecipitated by pouring the solution into 200 ml. of carbon tetrachloride. The precipitate so obtained was isolated by filtration and dried in vacuo. There was thus obtained 3.8 g. of a radiation-sensitive polymer of the invention in which 1 in 2 of the recurring units had the structure:

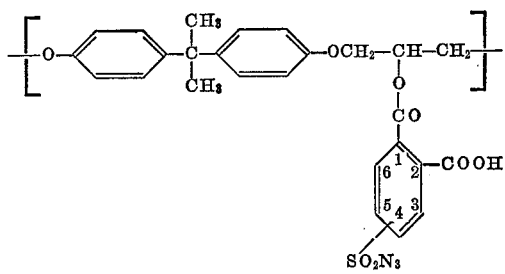

wherein the $SO_2N_3$ group is in the 4- or 5-position, and in which the remainder of the recurring units had the structure:

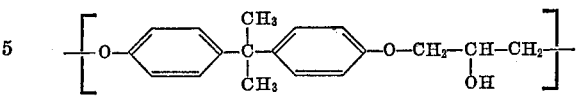

EXAMPLE 2

Using the procedure described in Example 1, but replacing the Phenoxy Resin PKHH there used by an equivalent amount (based on OH content) of polyvinyl alcohol containing 12 percent acetate [average molecular weight equals 500,000] there was obtained a light sensitive polymer in which 1 in 2 of the recurring units had the structure:

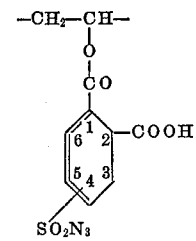

wherein the $SO_2N_3$ group is in the 4- or 5-position.

EXAMPLE 3

Using the procedure described in Example 1, but replacing the Phenoxy Resin PKHH there used by an equivalent amount (based on OH content) of poly[oxy-3,5 - (2 - hydroxy-4,7-methanoindene)] [Polycyclo 4200: Union Carbide Corporation; average molecular weight 2,000], there was obtained a light sensitive polymer characterized in that 1 in 2 of the recurring units had the structure:

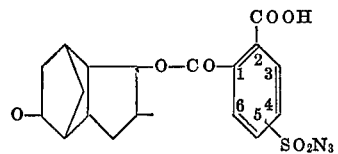

wherein the $SO_2N_3$ group is in the 4 or 5 position.

EXAMPLE 4

Using the procedure described in Example 1, but replacing the Phenoxy Resin PKHH there used by an equivalent amount (based on OH content) of novolac resin (average molecular weight=1000) there was obtained a light-sensitive polymer characterized in that 1 in 2 of the recurring units had the structure:

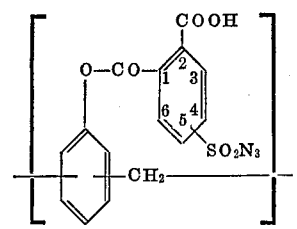

wherein the $SO_2N_3$ group is in the 4 or 5 position.

EXAMPLE 5

A solution of 1 g. of the radiation-sensitive modified phenoxy resin (produced as described in Example 1) in 20 ml. of a mixture of acetone and methanol was treated slowly, with vigorous agitation, with aqueous 2 N sodium hydroxide solution until the resulting mixture remained permanently alkaline to litmus. The resulting mixture was diluted with acetone and the precipitated sodium salt of the photosensitive modified phenoxy resin of Example 1 was isolated by filtration.

The above procedure was repeated except that the amount of sodium hydroxide solution was reduced to one-half of that used above. There was thus obtained a photosensitive modified phenoxy resin of Example 1 in which 1 in 2 of the free carboxylic groups had been converted to the sodium salt.

In similar manner, but replacing the aqueous sodium hydroxide solution with potassium hydroxide, lithium hydroxide, calcium hydroxide, or ammonium hydroxide, there are obtained the corresponding potassium, lithium, calcium, and ammonium salts of the photosensitive modified phenoxy resin of Example 1.

Similarly, the free carboxy groups in the photosensitive polymers described in Examples 2, 3, and 4 are partially or wholly converted to the corresponding salts.

EXAMPLE 6

A film was cast on a polyethylene plate using an acetone solution of radiation-sensitive modified phenoxy resin of Example 1. The resulting plate was covered with a negative of an image to be reproduced and the plate so covered was exposed to the light of a 200 w. super high pressure mercury lamp type USH 205D. Exposure was for 25 seconds with the plane of exposure at a distance of 50 cm. from the lamp. After irradiation the image deposited on the substrate was developed by washing with an aqueous 5 percent w./v. solution of sodium bicarbonate. The wash solution was acidified by addition of concentrated hydrochloric acid to reprecipitate the unchanged radiation sensitive phenoxy resin. The developed image on the polyethylene plate was then immersed for one minute in a hot dye bath (circa 80° C.) containing 3 percent by weight of Malachite green and 5 percent by weight of sodium chloride. The plate was finally rinsed with water and the colored image therein was found to be clear with high resolution.

The above process was repeated by replacing the aqueous sodium carbonate solution employed in the devolopment stage by one of aqueous triethylamine solution, aqueous ammonium hydroxide solution, and aqueous potassium carbonate.

EXAMPLE 7

A mixture of 2.54 g. (0.01 mole) og 4-azidosulfonylphthalic anhydride, 2.84 g. (0.01 unit/mole) of poly-(oxy - 1,4-phenylene-isopropylidene-1,4-phenyleneoxy-2-hydroxytrimethylene) [Phenoxy Resin PKHH] in 50 ml. of dry pyridine was stirred and heated at 70° C. for 5 hours. The mixture was worked up using the procedure described in Example 1. The polymer was dissolved in 50 ml. of tetrahydrofuran, after addition of 1.0 g. (0.01 mole) of triethylamine; the resulting solution was evaporated to dryness under reduced pressure, and the residue was dried in vacuo. There was thus obtained the triethylamine salt of a radiation sensitive polymer of the invention in which 1 in 2 of the recurring units had the structure:

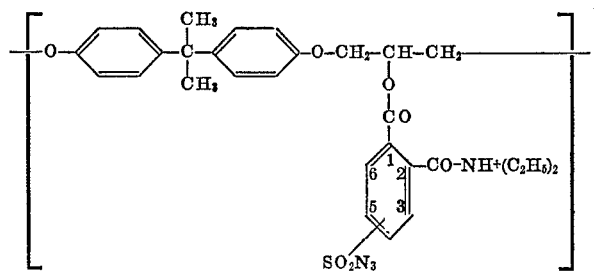

wherein the $SO_2N_3$ group is in the 4- or 5-position.

Films were deposited on both glass and polyethylene using a solution of the above triethylamine salt in a mixture of acetone and tetrahydrofuran. The coated substrates, in both cases, were covered with negatives of an image to be reproduced, and then exposed to the light of a 200 w. super high pressure mercury lamp type USH 205D. Exposure was for 25 seconds with the plane of exposure at a distance of 50 cm. from the lamp. After irradiation the image deposited on the substrate was developed by washing with water to remove the unexposed photosensitive film. The aqueous solution so recovered was acidified to regenerate the unchanged photosensitive polymer. The resulting developed image was then immersed for one minute in a hot dye bath (circa 80° C.) containing 3 percent by weight of Malachite green and 5 percent by weight of sodium chloride. The film was thereafter rinsed with water and the colored image produced was found to be very clear with fine resolution.

What is claimed is:

1. A radiation-sensitive polymer having molecular weight 100,000 to 2,000,000 selected from the group consisting of (i) a polymer wherein from about 10 to about 100 percent of the recurring units in the chain thereof are moieites of the formula:

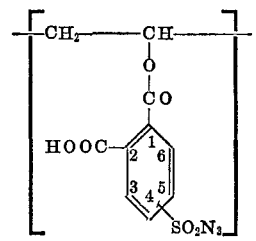

wherein the —$SO_2N_3$ group is in the one of the positions 4 and 5 and from about 90 to 0 percent of the recurring units in the chain of said polymer are moieties of the formula:

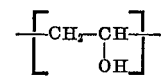

and (ii) the salts of the above polymers with a salt-forming moiety selected from the class consisting of alkali metals, alkaline earth metals, ammonia and tertiary organic amines.

2. A radiation-sensitive polymer having molecular weight 100,000 to 2,000,000 selected from the group consisting of (i) a polymer wherein from about 10 to about 100 percent of the recurring units in the chain thereof are moieties of the formula:

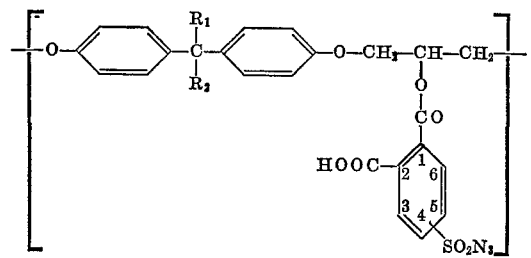

wherein the —$SO_2N_3$ group is in one of the positions 4 and 5 and $R_1$ and $R_2$ are lower-alkyl, and from about 90 to 0 percent of the recurring units in the chain of said polymer are moieties of the formula:

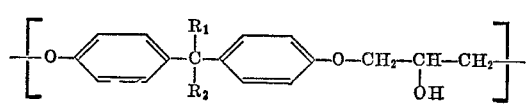

wherein $R_1$ and $R_2$ are as above defined, and (ii) the salts of the above polymers with a salt-forming moiety selected from the class consisting of alkali metals, alkaline earth metals, ammonia and tertiary organic amines.

3. A radiation-sensitive polymer having molecular weight 100,000 to 2,000,000 selected from the group consisting of (i) a polymer wherein from about 10 to about 100 percent of the recurring units in the chain thereof are moieties of the formula:

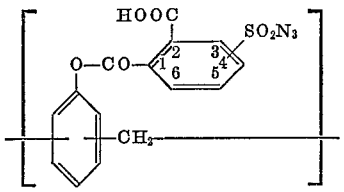

wherein the —$SO_2N_3$ group is in one of positions 4 and 5 and from about 90 to 0 percent of the recurring units in the chain of said polymer are moieties of the formula:

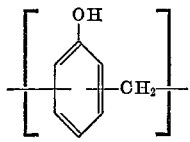

and (ii) the salts of the above polymers with a salt-forming moiety selected from the class consisting of alkali metals, alkaline earth metals, ammonia and tertiary organic amines.

4. A radiation-sensitive polymer having molecular weight 100,000 to 2,000,000 selected from the group consisting of (i) a polymer wherein from about 10 to about 100 percent of the recurring units in the chain thereof are moieties of the formula:

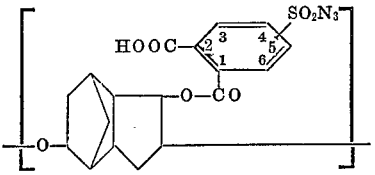

wherein the —$SO_2N_3$ group is in one of positions 4 and 5 and from about 90 to 0 percent of the recurring units of the chain of said polymer are moieties of the formula:

and (ii) the salts of the above polymers with a salt-forming moiety selected from the class consisting of alkali metals, alkaline earth metals, ammonia and tertiary organic amines.

References Cited
UNITED STATES PATENTS
3,462,268  8/1969  Danhauser et al. _____ 96—35.1
3,583,939  8/1971  Bostick et al. _____ 260—46.5

WILLIAM H. SHORT, Primary Examiner

L. L. LEE, Assistant Examiner

U.S. Cl. X.R.

96—35.1; 117—34, 124 E, 132 B, 138.8 D, 138.8 E, 138.8 F, 138.8 N, 155 R; 204—159.14; 260—29.2 N, 30.4 N, 32.8 N, 57 R, 78.4 D, 346.3

UNITED STATES PATENT OFFICE
CERTIFICATE OF CORRECTION

Patent No. 3,751,393    Dated August 7, 1973

Inventor(s) Adnan A. R. Sayigh, Fred A. Stuber and Henri Ulrich

It is certified that error appears in the above-identified patent and that said Letters Patent are hereby corrected as shown below:

Column 3, line 50:

aziosulfonylphthalic    should read: azidosulfonylphthalic

Column 6, lines 4-8:

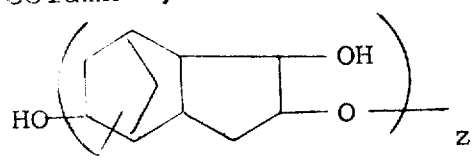    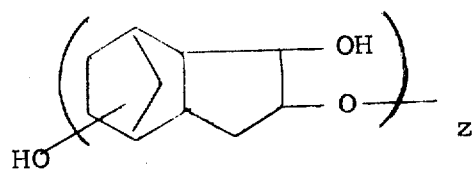

Column 6, line 39: ploymers   should read: polymers

Column 6, line 70: latmps   should read: lamps

Column 10, lines 20-25:    should read:

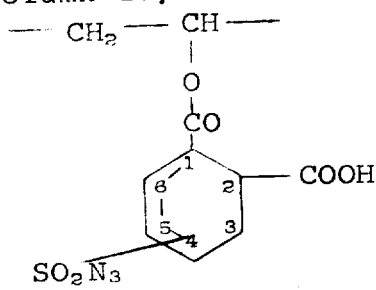    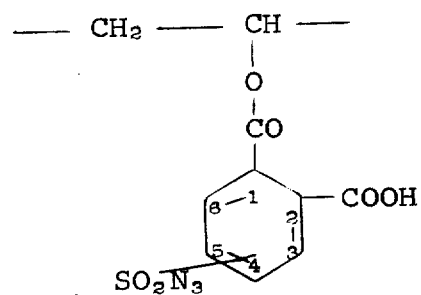

Column 11, line 43: og    should read: of

Column 11, lines 63-68:    should read:

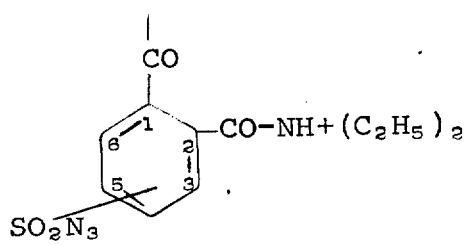    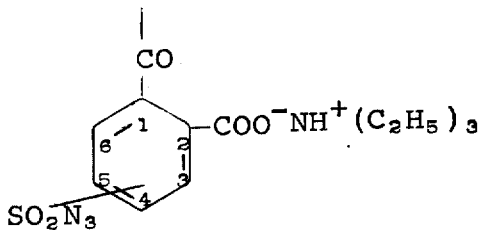

Signed and sealed this 18th day of December 1973.

(SEAL)
Attest:

EDWARD M. FLETCHER, JR.
Attesting Officer

RENE D. TEGTMEYER
Acting Commissioner of Patents